United States Patent [19]

Burst et al.

[11] Patent Number: 4,996,849

[45] Date of Patent: Mar. 5, 1991

[54] AIR CONDITIONING SYSTEM

[75] Inventors: Hermann Burst, Rutesheim; Horst Petri, Hemmingen; Bernhard Ritter, Pforzheim; Dietmar Gaigl, Leonberg; Walter Pross, Sindelfingen, all of Fed. Rep. of Germany

[73] Assignee: DR. IHG. H.C.F. Porsche AG, Federal Republic of Germany

[21] Appl. No.: 430,644

[22] Filed: Oct. 31, 1989

[30] Foreign Application Priority Data

Oct. 31, 1988 [DE] Fed. Rep. of Germany ....... 3836991

[51] Int. Cl.⁵ ........................... B60H 1/32; F24F 7/00
[52] U.S. Cl. ........................................ 62/133; 62/186; 165/16; 98/2.01; 236/49.3
[58] Field of Search ................. 62/133, 177, 178, 179, 62/180, 181, 184, 243, 244; 98/2.01; 165/16, 41, 42, 43, 44; 236/49.1, 49.3

[56] References Cited

U.S. PATENT DOCUMENTS 4,523,715 6/1985 Ohsawa et al. ................... 62/179 X
4,913,347 4/1990 Burst et al. ........................ 165/43 X

FOREIGN PATENT DOCUMENTS 0060510 9/1982 European Pat. Off. ............. 98/2.01
0167223 10/1983 Japan ..................................... 98/2.01

Primary Examiner—Harry B. Tanner
Attorney, Agent or Firm—Emerson, Wands, Edwards, Lenahan & McKeown

[57] ABSTRACT

An air conditioning system for a preferably air cooled vehicle has a housing having an evaporator, a chamber and at least one blower. The housing, by way of outlet ducts having individually blockable defroster, center and legroom nozzles, is connected with a passenger compartment. By way of a warm air duct having an exhaust gas heat exchanger, the housing is acted upon by warm air, by way of an inflow duct having a fresh air flap controlled by an electric motor, it is acted upon by fresh air, and by way of an inflow duct for circulating air, it is acted upon by air from the interior of the vehicle. In this case, warm air and/or fresh air and/or circulating air, by way of a temperature mixing flap, is guided to a blower, is swirled together and mixed in it, and subsequently by way of the individual outlet ducts, is guided to the passenger compartment. In order to avoid air throughput fluctuations, the fresh air flap is controlled as a function of the driving speed of the motor vehicle, of the position of the temperature mixing flap, of a rotational speed step of the blower and of a switching condition of an electromagnetic clutch of a refrigerant compressor.

23 Claims, 8 Drawing Sheets

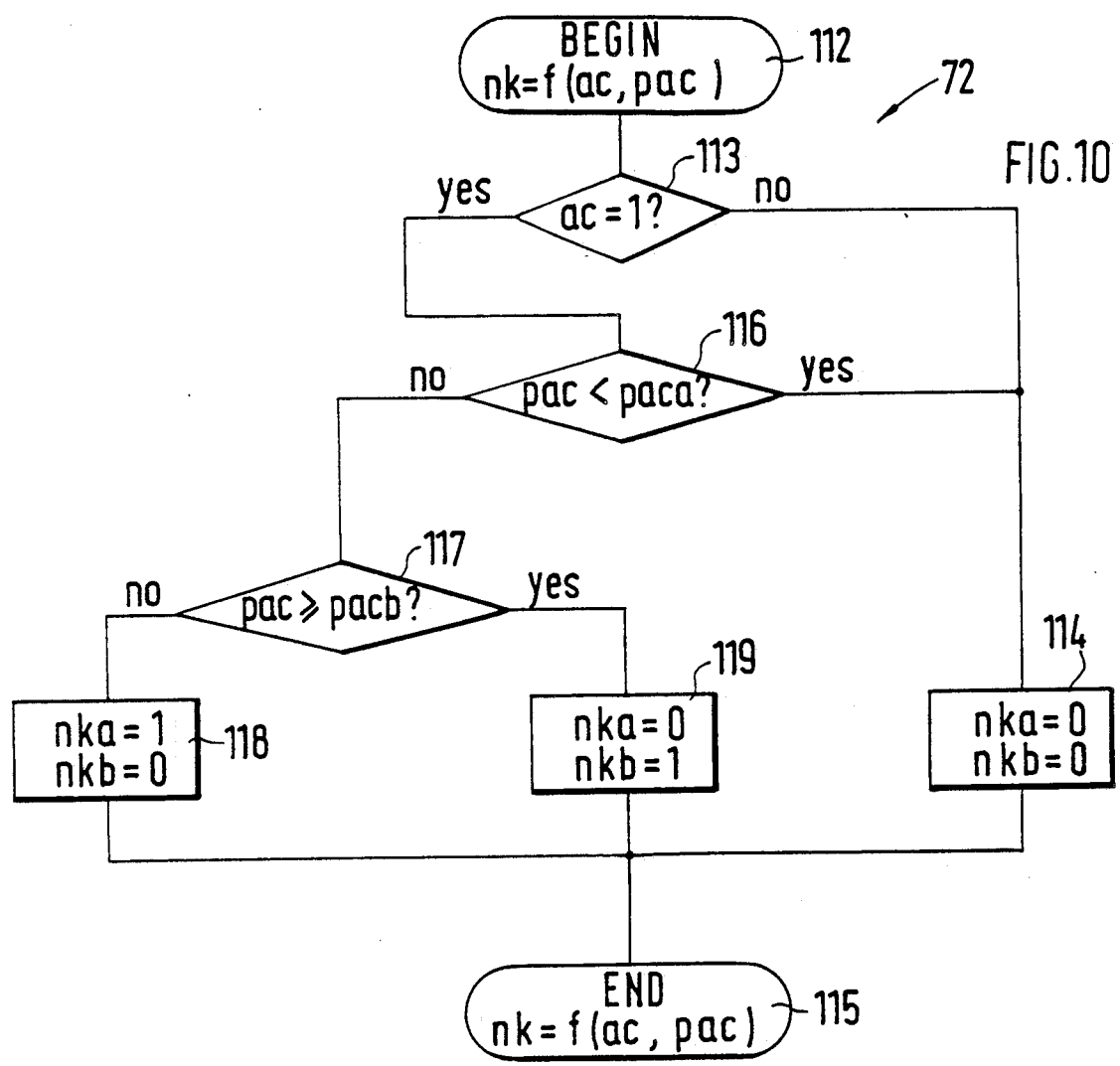

AIR CONDITIONING SYSTEM

BACKGROUND AND SUMMARY OF THE INVENTION

The present invention generally relates to an air conditioning system such as disclosed by co-pending U.S. patent application Ser. No. 07/379,961 filed July 15, 1989, U.S. Pat. No. 4,913,347, and more particularly to a control for an air conditioning system of this type.

According to U.S. patent application Ser. No. 07/379,961, the entire disclosure of which is herein incorporated by reference an air conditioning system is provided for a preferably air cooled vehicle. Measures are taken with respect to this air conditioning system which rapidly compensate changing warm air temperatures or fluctuations in volume so that a constant temperature exists in a passenger compartment of the vehicle.

This is mainly achieved in that warm air and/or fresh air and/or circulating air, or fresh air or circulating air which is cooled by way of an evaporator of the air conditioning system, together, is guided to at least one blower, is swirled together and mixed in this blower, and the mixed air subsequently, by way of individual outlet ducts, is guided to the passenger compartment. A blow out air temperature sensor arranged behind the blower senses a temperature deviation ($\Delta T$) of the mixed air from a desired temperature and, if necessary, automatically corrects the position of a temperature mixing flap provided in front of the blower.

It is an object of the invention to provide a control of this type for this type of an air conditioning system, particularly in regard to the compensation of fluctuations in volume flow.

Principal advantages of the invention include that fluctuations of the air volume flow passing through the passenger compartment are virtually compensated.

This is mainly achieved by the fact that a control apparatus of the air conditioning system senses a driving speed of the motor vehicle as well as a position of a temperature mixing flap, a rotational speed of a blower, and a switching condition of an electromagnetic clutch of a refrigerant compressor, and determines and adjusts a desired position of a fresh air flap as a function of these influencing variables. The control is also expanded to several important safety and emergency functions which permit a limited operation also in the case of disturbances in individual components of the air conditioning system.

Other objects, advantages and novel features of the present invention will become apparent from the following detailed description of the invention when considered in conjunction with the accompanying drawings.

BRIEF DESCRIPTION OF THE DRAWINGS

FIG. 10 is a flow charge according to FIG. 3 for a control sequence of a condenser blower.

DETAILED DESCRIPTION OF THE DRAWINGS

Figure 1:
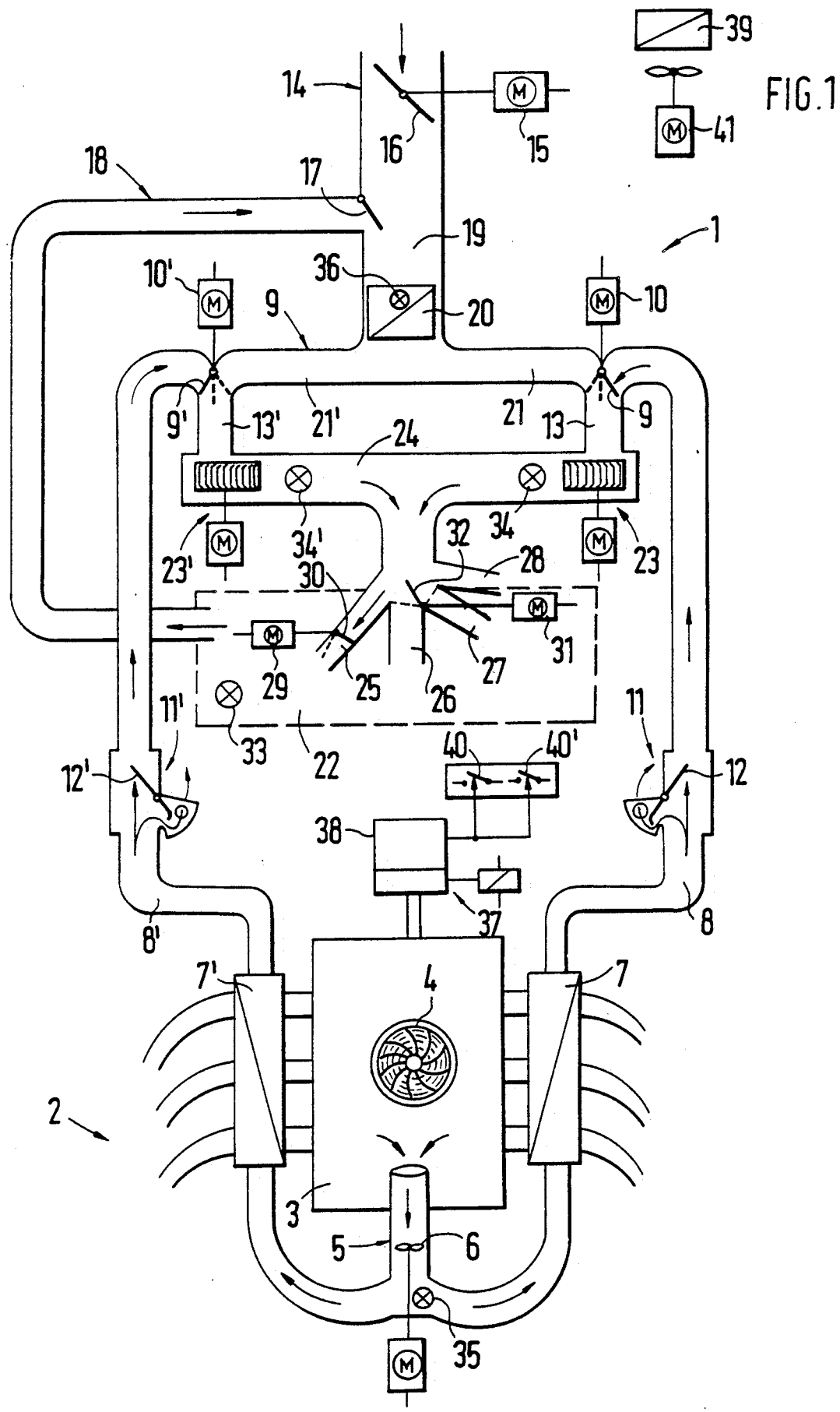
FIG. 1 is a schematic representation of the air conditioning system according to one embodiment of the invention.

In FIG. 1, an air conditioning system 1 of a motor vehicle is shown with, for example, an air cooled internal combustion engine 3 arranged at the rear 2 (which is not absolutely necessary) and having an engine cooling fan 4 which supplies fresh air to an engine compartment for the cooling of the internal combustion engine 3. Part of the air taken in by the engine cooling fan 4 (and preheated by parts of the internal combustion engine) is supplied to exhaust gas/air heat exchangers 7, 7' by an electric heater blower 6 by way of an inflow pipe 5. For this purpose, the inflow pipe 5 is divided into two pipe trains behind the heater blower 6. In the heat exchangers 7, 7', the lost heat contained in the exhaust gas of the internal combustion engine 3 is transferred to the air in the inflow pipe 5.

Starting from the heat exchangers 7, 7', warm air ducts 8, 8' are provided which guide the heated air to temperature mixing flaps 9, 9'. The temperature mixing flaps 9, 9' can be adjusted by electric motors 10, 10', for example, geared motors.

In the two warm air ducts 8, 8', one flap box 11, 11', respectively having a differential pressure controlled flap 12, 12', is arranged downstream from the heat exchangers 7, 7'. When the temperature mixing flaps 9, 9' are open, the heated air is guided either into the ducts 13, 13' downstream from the temperature mixing flaps 9, 9' or, when the temperature mixing flaps 9, 9' are partially open or closed, the heated air is guided partially or completely into the open air by way of the flap boxes 11, 11' as a result of the increased differential pressure.

A fresh airduct 14, having a fresh air flap 16 controlled by an electric motor 15, together with a circulating air duct 18 closed off by a pressure actuated circulating air flap 17, leads into a cold air train 19 which, downstream of an evaporator 20, is divided into two parts 21, 21' leading in the direction of the temperature mixing flaps 9, 9'.

A circulating air duct 18 connects the cold air train 19 with a passenger compartment 22, in which case a circulating air flap 17 opens automatically (flutter valve) when the fresh air flap 16 is closed and the electric motor driven blowers 23, 23', connected behind the ducts 13, 13', are running. The blowers 23, 23' mix the cold or warm air currents supplied through ducts 21, 21' of the cold air train 19 and the warm air ducts 8, 8' and guide the mixed air into a pressure chamber 24.

From the pressure chamber 24, outlet ducts 25, 26, 27 and 28 lead to outflow devices in the passenger compartment 22. The outlet duct 25 can be closed by a legroom flap 30 actuated, for example, by an electric motor 29. A distribution of air to the outlet duct 27 leading to a defroster nozzle and to the outlet duct 26 leading to the center nozzles can be controlled by a defroster flap 32 controlled, for example, by an electric motor 31. The outlet duct 28 leads to (not necessarily) manually adjustable side nozzles (not shown).

The air conditioning system 1 also comprises different temperature sensors whose signals control/regulate the air conditioning system. These sensors include a passenger compartment temperature sensor 33, one blow out temperature sensor 34, 34' respectively connected behind the blowers 23, 23', a warm air temperature sensor 35 connected behind the heater blower 6; and an evaporator temperature sensor 36 arranged at the evaporator 20.

The air conditioning system 1 also comprises a refrigerant compressor 38 driven by, for example, the internal combustion engine 3 by way of an electromagnetic clutch 37, a condenser 39 arranged in a forward area of the vehicle, and a refrigerant pressure sensor 40, 40'. The condenser 39 is subjected to forced ventilation by a condenser blower 41.

For reasons of clarity, the electrical connections of the electric arrangements with respect to one another and with respect to a control apparatus as well as the refrigerant circuits are not shown. The electrical component arrangement for the control apparatus will be described with respect to the block diagram according to FIG. 2, while the refrigerant circuits correspond to the conventional vehicle standard.

Figure 2:
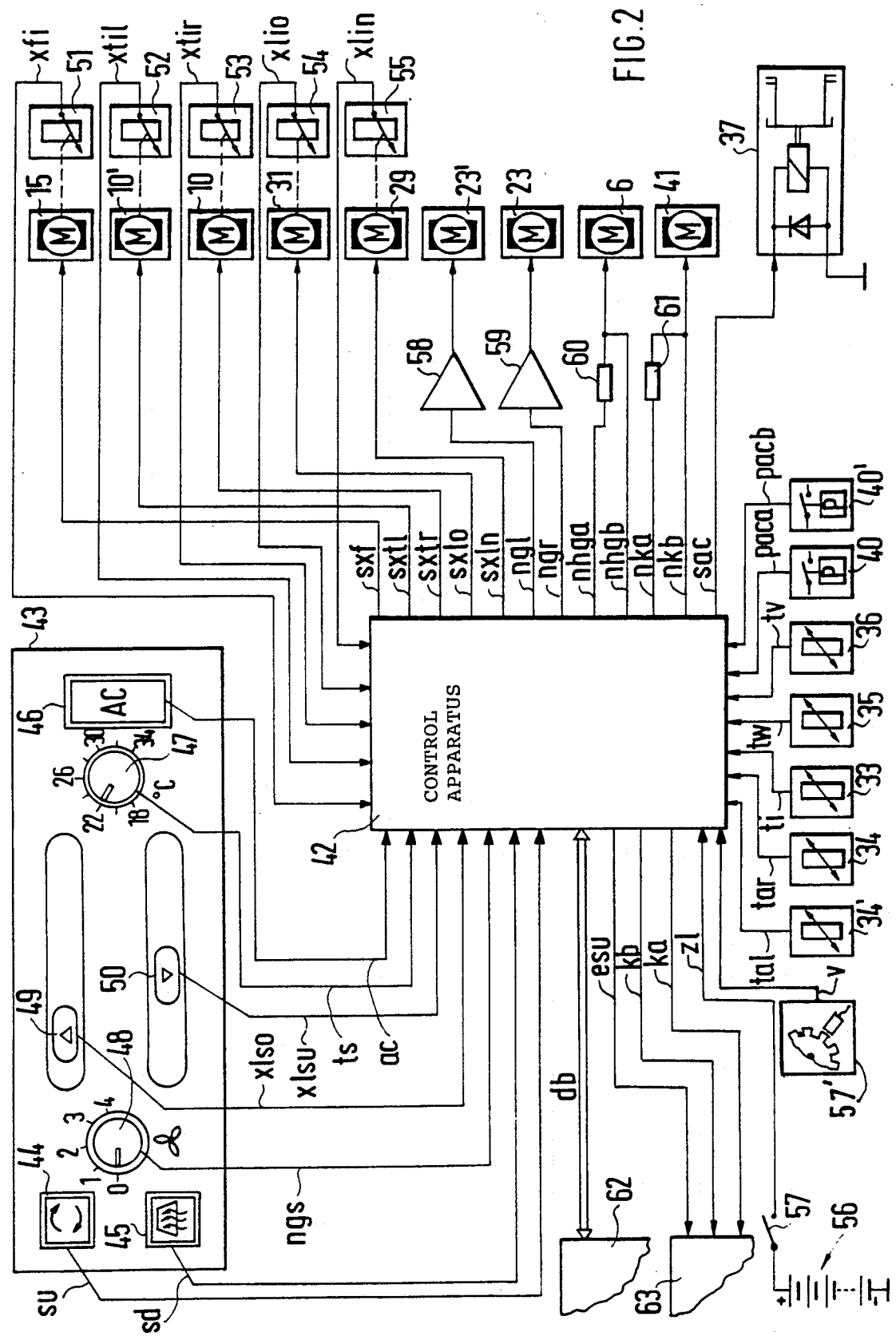
FIG. 2 is a block diagram of a control for the air conditioning system of FIG. 1.

FIG. 2 shows a control apparatus 42 which preferably is constructed on the basis of a programmable microcomputer. By way of an operating unit 43 arranged in a control panel of the motor vehicle, this control apparatus 42 is acted upon by desired signal values: su (circulating air signal), sd (defrosting signal), ngs (blower speed signal), xlso (air distribution signal-head room), xlsu (air distribution signal-leg room), ts (desired temperature) and ac (air conditioning system signal).

For this purpose, the operating unit 43 is provided with switching operating elements having a selected circulating air operation position provided by a circulating air key 44, to set the desired circulating air signal su, a selected defrosting operation position provided by a defrosting key 25, to set the desired defrosting signal sd, a selected air conditioning operation position provided by an air conditioning key 46, to set the desired air conditioning system ac.

By these arbitrarily adjustable switching operating elements, such as, for example, potentiometers, desired signal values can be indicated for the desired temperature ts in the passenger compartment set by a temperature adjusting device 47; the blower rotational speed step ngs set by blower rotational speed adjusting device 48; the desired air distribution-headroom xlso set by adjusting device 49; and the desired air distribution-legroom xlsu set by adjusting device 50.

The control apparatus 42 detects the following sensor signals:
tal of blow out temperature sensor 34',
tar of blow out temperature sensor 34,
ti of passenger compartment temperature sensor 33,
tw of warm air temperature sensor 35,
tv of evaporator temperature sensor 36,
paca of refrigerant pressure sensor 40,
pacb of refrigerant pressure sensor 40',
as well as position signals of position indicators (position potentiometers),
xfi of fresh air flap position indicator 51;
xtil of temperature mixing flap position indicator left, 52;
xtir of temperature mixing flap position indicator right, 53;
xlio of defrosting flap position indicator 54;
xliu of legroom flap position indicator 55;
ze of ignition switch 57 connected with a battery 56 and
v of driving speed indicator 57' of the vehicle.

The following control signals of the control apparatus 42 control the following respective components:
sxf controls the electric motor 15 of the fresh air flap 16;
sxtl controls the electric motor 10' of the temperature mixing flap 9';
sxtr controls the electric motor 10 of the temperature mixing flap 9;
sxlo controls the electric motor 31 of the defrosting flap 32;
sxlu controls the electric motor 29 of the fresh air flap 30;
ngl (by means of an end step 58) controls the blower 23';
ngr (by means of an end step 59) controls the blower 23;
nhga and a multiplier 60 control the heater blower 6;
nhgb controls the heater blower 6 directly;
nka and a multiplier 61 control the condenser blower 41;
nkb controls the condenser blower 41 directly; and
sac controls the electromagnetic clutch 37 of the refrigerant compressor 38.

The control apparatus 42 can also communicate with a diagnostic computer 62 by way of a diagnostic bus db and emit a stop signal esu for stopping a throttle cut off to the motor management control apparatus 63 while the temperature mixing flaps are wide open (in this regard, reference is made to a German patent application Ser. No. DE3836992 with the title "An Air-Conditioning Arrangement for a Motor Vehicle" filed on Oct. 31, 1988 at the German Patent Office), and can emit an air conditioning readiness signal kb and an air conditioning switching signal ka (electromagnetic clutch closed 37) for an idle charge control.

Figure 3:
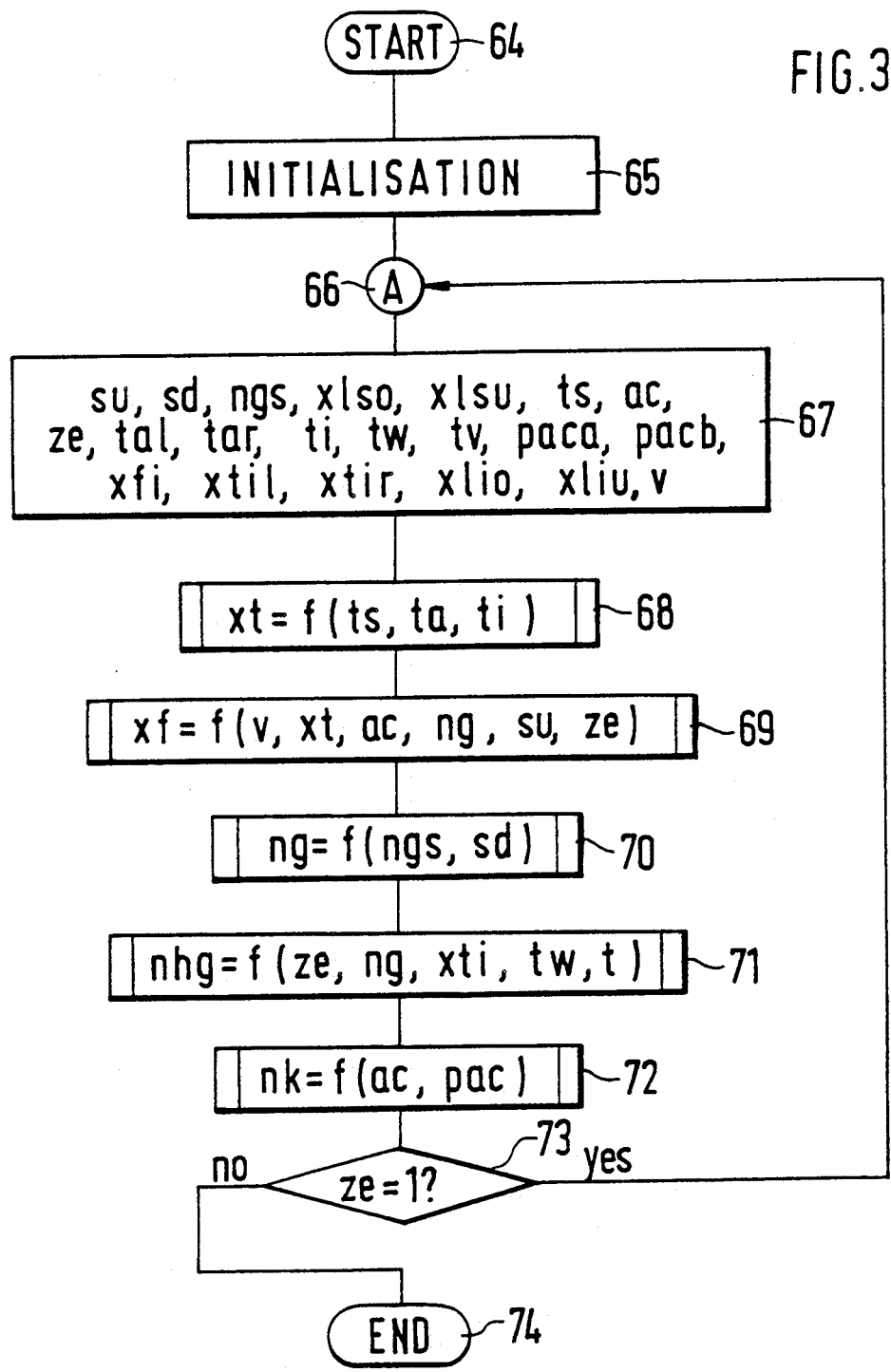
FIG. 3 is a flow chart of a main program for the control of the air conditioning system of FIG. 1.

FIG. 3 shows a flow chart of a control program in the form of software or firmware, for the control apparatus 42 of the air conditioning unit 1. After the start step 64 of the program at step 64, an initialization step 65 of the computer, and passing a reference mark A, at step 66, a detection step 67 takes place during which desired signal values su, sd, ngs, xlso, xlsu, ts and ac and measured values ze, tal, tar, ti, tw, tv, paca, pacb, xfi, xtil, xtir, xlio, xliu and v are detected.

Subsequently, in a subroutine 68, the position xt of the temperature mixing flaps is computed and adjusted from the desired temperature value ts and the measured values ta (tal, tar) of the blow out temperature sensors 34', 34 and ti of the passenger compartment temperature sensor 33. However, this subroutine 68 will not be further examined here.

A subroutine 69, explained in detail with reference to FIG. 4, computes the position xf of the fresh air flap 16 and adjusts the position xf of the fresh air flap 16 as a function of the driving speed v, the position of the temperature mixing flap(s) xt, the desired air conditioning signal ac, the blower rotational speed step ng, the desired circulating air signal su and the ignition signal ze.

A subroutine 70 determines the blower rotational speed step ng from the desired rotational speed ngs of the blower and the desired defrosting signal sd and adjusts it; such that, if sd=0, then ng=ngs; however, in the defroster operation (sd=1), ng is controlled to a maximum rotational speed (ng=ngmax).

A subroutine 71 determines the control of the heater blower 6 on the basis of the ignition signal ze, the blower rotational speed step ng, the temperature mixing flap position xti, the signal tw of the warm air temperature sensor 35 and the time t (elapsed time after the ignition is switched off). This subroutine 71 will be explained in detail with reference to FIG. 9.

A subroutine 72 takes over the control of the condenser blower 41 on the basis of the air conditioning signal ac and signal pac (paca, pacb) of the refrigerant sensors 40, 40'. This will be shown and described with reference to FIG. 10.

Also, an inquiry step 73 takes place as to whether the ignition of the internal combustion engine is switched on. If the answer is yes, the program run is started again at reference mark A, at step 66; however, if the answer is no, all systems are switched off, the fresh air flap 16 is shut (in order to prevent water entering into the vehicle for example in car washes), and the program is terminated, at step 74.

Figure 4:
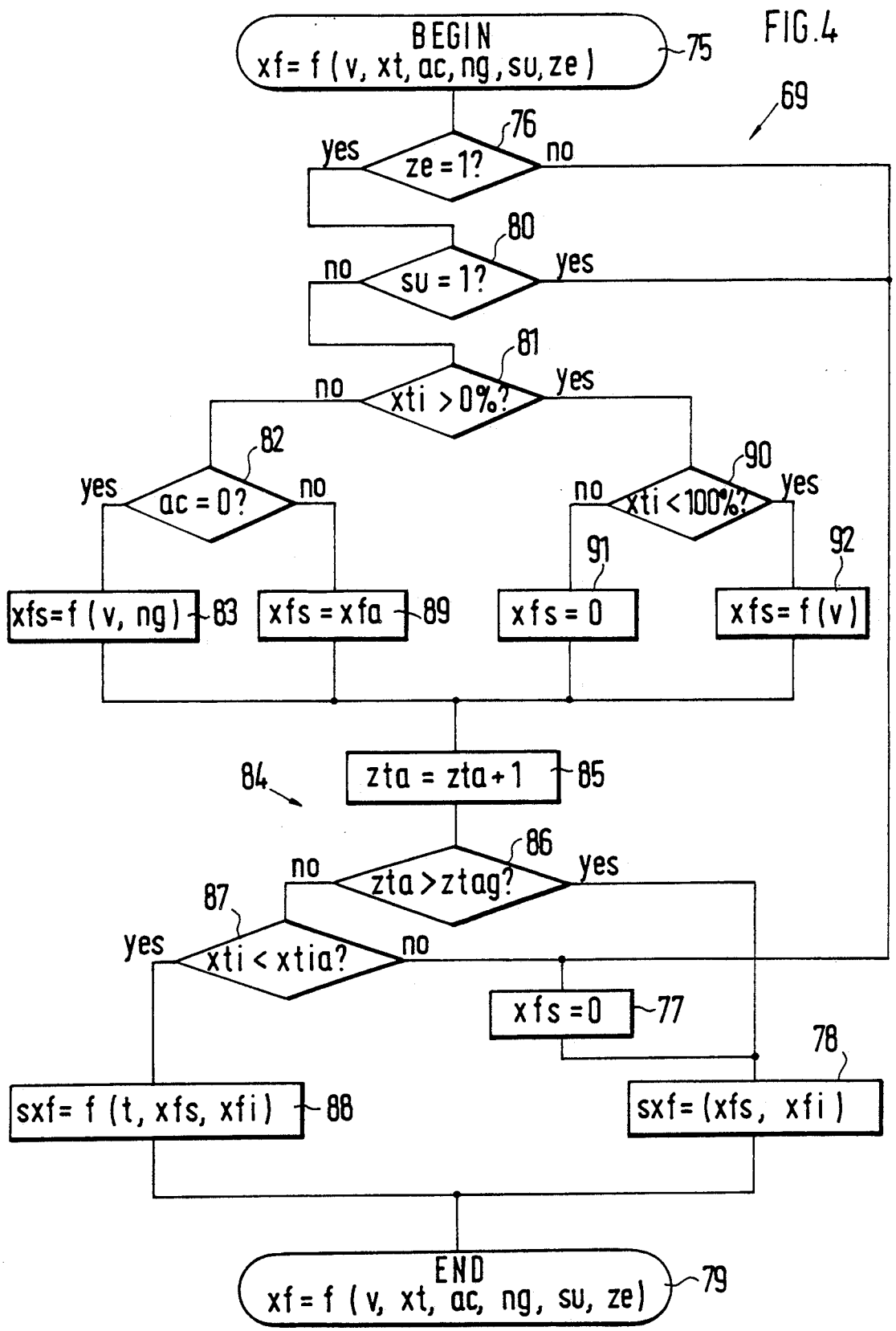
FIG. 4 is a flow chart according to FIG. 3 for the control of a fresh air flap of the air conditioning system of FIG. 1.

In the program described in FIG. 4 for the control of the fresh air flap 16, an inquiry step 76 takes place after the program start at 75 as to whether the ignition is switched on (ze=1). If the answer is no, a desired value xfs for the position of the temperature mixing flap is set to zero (close fresh air flap, 77), and the control signal sxf is determined for the control of the motor 15 of the fresh air flap 16 corresponding to the control difference xfs-xfi, and is emitted to the motor 78 or an interposed position control circuit which is not described in detail, and the program is terminated at step 79.

Figure 5:
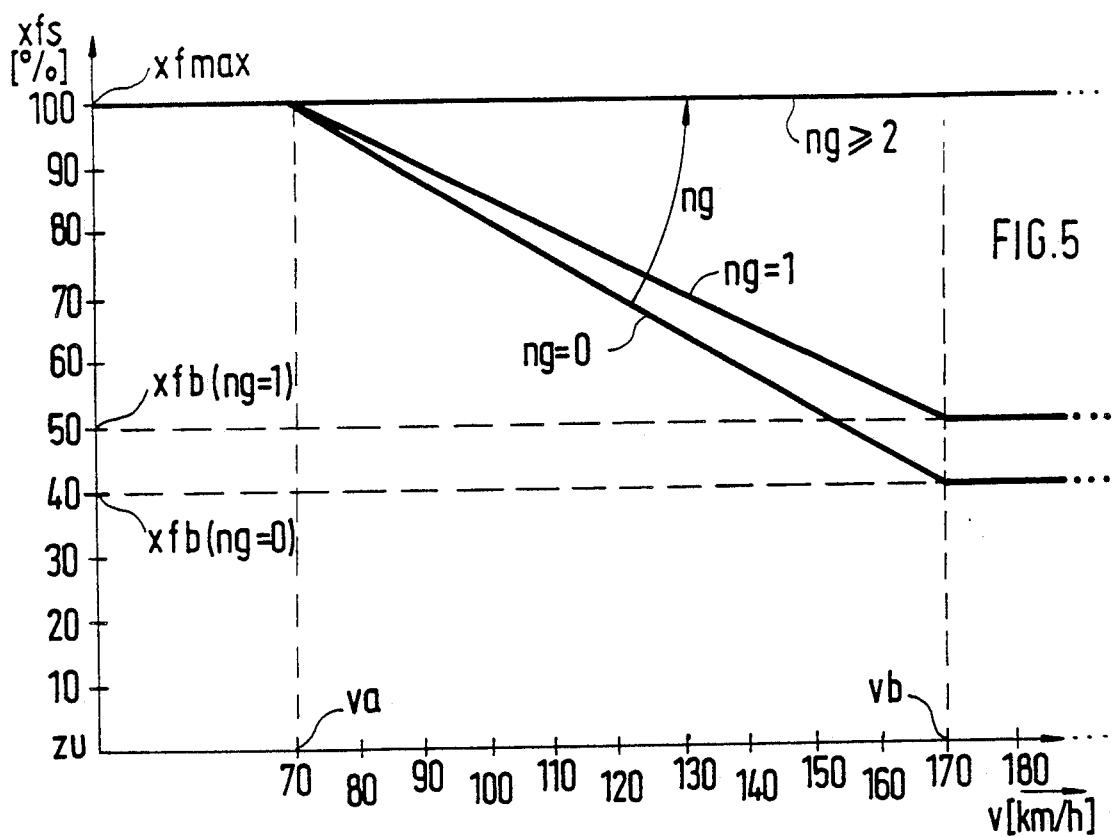
FIG. 5 is a diagram illustrating a functional relationship between a driving speed and a desired position of the fresh air flap.

If the ignition is on at inquiry step 76, the program proceeds to step 80 where it is examined whether the desired signal circulating air su is set (su=1). If the answer is yes, the program proceeds to program step 77 (close fresh air flap); and if the answer is no, the program proceeds to step 81 where it is queried whether the temperature mixing flap is open (xti>0; i.e., whether at least one of the two temperature mixing flaps is open). If the answer is no, the program proceeds to step 82 where it is queried whether ac=0, i.e. electromagnetic clutch 37 is open, the program proceeds to program step 83 where the desired position xfs is determined from the driving speed v and the blower rotational speed step ng corresponding to a functional relationship, for example as illustrated by FIG. 5. Subsequently, a counting quantity zta of a cold start timer 84, which was set to zero at the start of the internal combustion engine 3 in program step 65 of the main program according to FIG. 3, is increased by 1 in program step 85, and it is examined, in program step 86, whether this value has already exceeded a limit value ztag (warm up phase finished).

Figure 6:
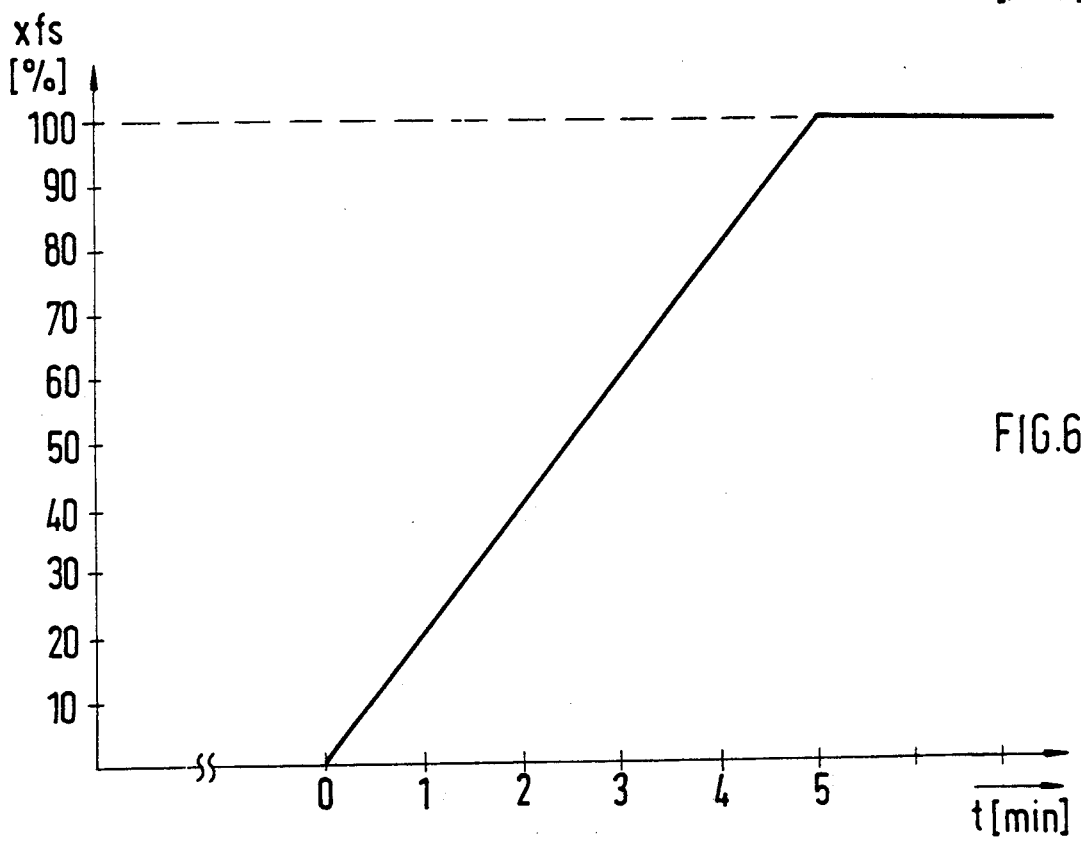
FIG. 6 is a diagram illustrating a functional relationship between a desired position for the fresh air flap with respect to time.

If this is so, the desired value xfs is set corresponding to program step 78, if it is not so, it is examined, in program step 87, whether the position of the temperature mixing flap (one of them or both) is smaller than a certain limit value xtia (for example, 55% of the maximum position open). If the answer is no, program step 77 is continued. However, if the answer is yes, the control signal of the fresh air flap, in addition to the control deviation xfs-xti, 6 is also determined dependent on the time, in program step 88, corresponding to a functional relationship, for example, as illustrated by FIG. 6, and the program is terminated in program step 79. In this case, the level of the counter reading zta is a measurement for the time t that has elapsed since the start.

Figure 7:
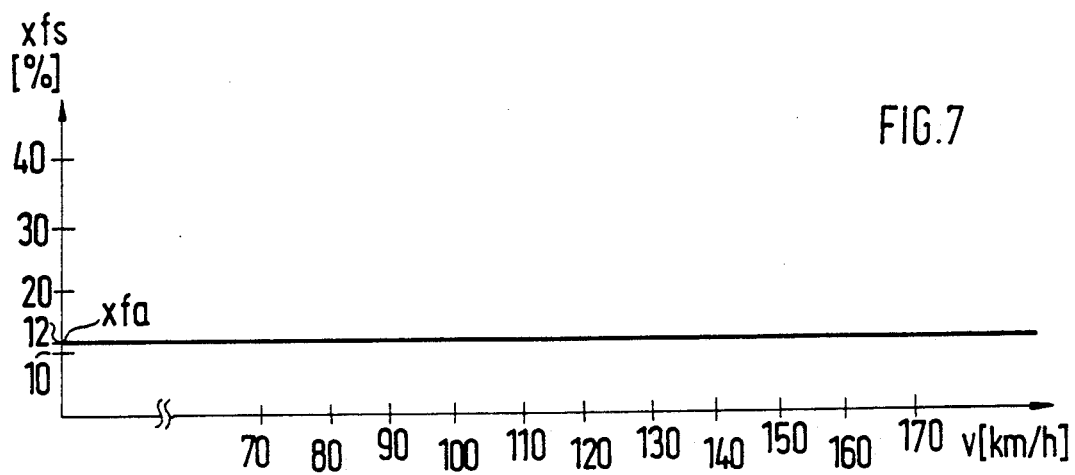
FIG. 7 is a diagram according to FIG. 5 for a different operating condition of the air conditioning system.

If the inquiry at program step 82 is negative i.e. air conditioning system switched on, the desired value xfs is set in program step 89 to a value xfa (for example 12% opening) corresponding to the functional relationship illustrated by FIG. 7, i.e. air conditioning operation with a constant replacement of a certain quantity of circulating air, and the program is continued by means of program step 85.

Figure 8:
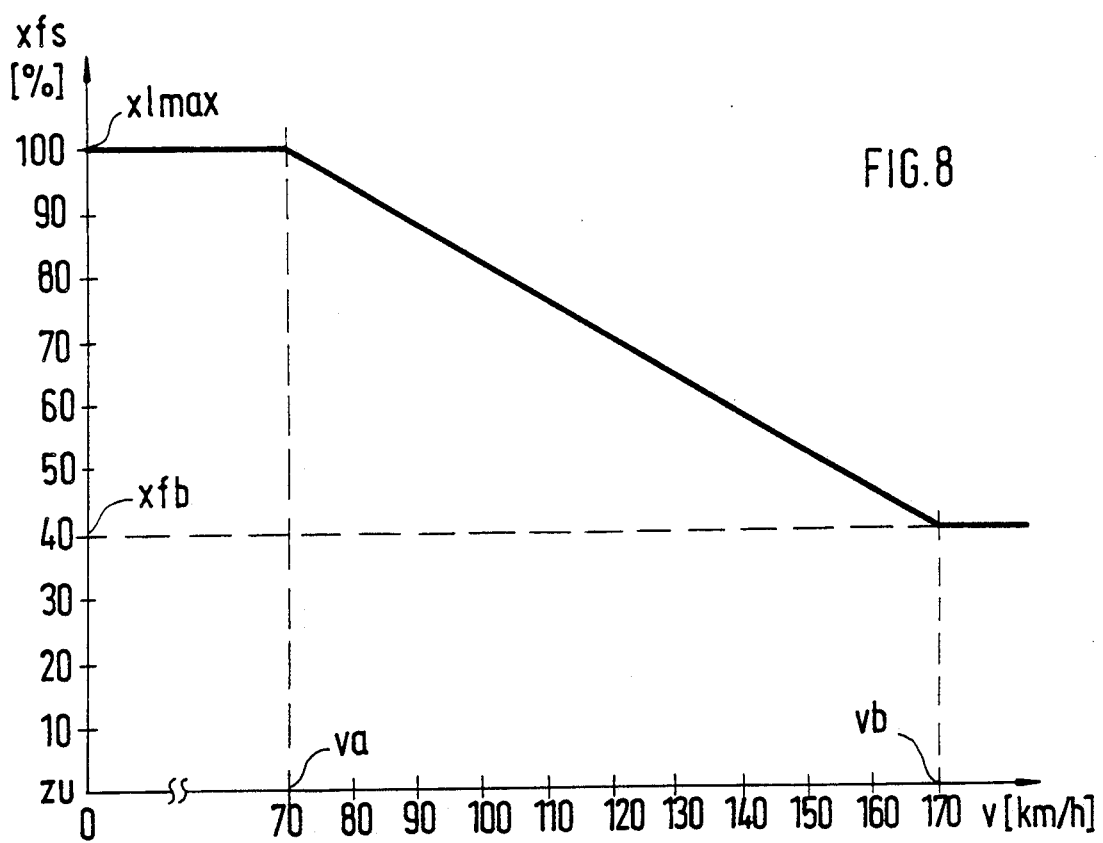
FIG. 8 is a diagram according to FIG. 7 for an additional operation condition of the air conditioning system.

If the inquiry at program step 81 is positive, it is examined in another inquiry at program step 90 whether the temperature mixing flap is not yet completely open. If this is not the case (maximal heating), the desired value xfs is set to zero in program step 91. If this is the case, the desired value is determined in program step 92 corresponding to a functional relationship, for example as illustrated by FIG. 8, from the driving speed v. In both cases, the program is continued by means of program step 85.

FIG. 5 shows a driving speed/fresh air flap desired position diagram which reflects the function xfs=f (v, ng) corresponding to program step 83. This diagram and also the diagrams which follow corresponding to FIGS. 6 to 8 may be stored in the computer in the form of tables. In this case, addresses for memory locations are formed, for example, from the abscissa values, from which finally the functional values (ordinate values) of the function may be read (characteristic curves, look-up table). Naturally, the ordinate values of the straight lines shown in the diagrams may also be calculated algebraically.

FIG. 5 shows three examples from a family of straight lines. Which straight line will finally be used for the calculation of the position of the fresh air flap will be determined by the parameter blower rotational speed step ng. In lower speed range $0 \leq v < va$, the fresh air flap is completely open (xfmax corresponds to 100%). In a medium speed range $va \leq v < b$, the desired fresh air flap position, with increasing speed, is closed increasingly down to a value xfb and remains on this value in a subsequent higher speed range $v \geq vb$. However, value xfb (non-linearly) is dependent on the rotational speed step of the blower. Thus, at a rotational speed step ng=0 corresponding to the minimum rotational speed ngmin, this value xfb corresponds to approximately 40%. With increasing rotational speed steps, the xfb value takes on higher values until, starting at rotational speed step ng>2, the fresh air flap, independently of the speed, remains completely open.

FIG. 6 shows, by means of a time/fresh air flap position diagram, how the fresh air flap, in a warm up phase of the internal combustion engine 3, within a certain time period, is brought up to a desired value, in which case, it is assumed here that the desired fresh air flap position to be reached corresponds to value xfmax of 100%.

FIG. 7 shows the desired fresh air flap position during the air conditioning operation corresponding to program point 89 of FIG. 4. In this case, the desired fresh air flap position, independently of the speed, is adjusted to a value xfa of, for example, 12%.

FIG. 8 shows a driving speed/desired fresh air flap position diagram corresponding to program step 92 of FIG. 4 when the temperature mixing flap is partially open. The shown straight line, in this case, is independent of the blower rotational speed step ng and corresponds essentially to the straight line shown in FIG. 5 for the blower rotational speed step ng=0.

Figure 9:
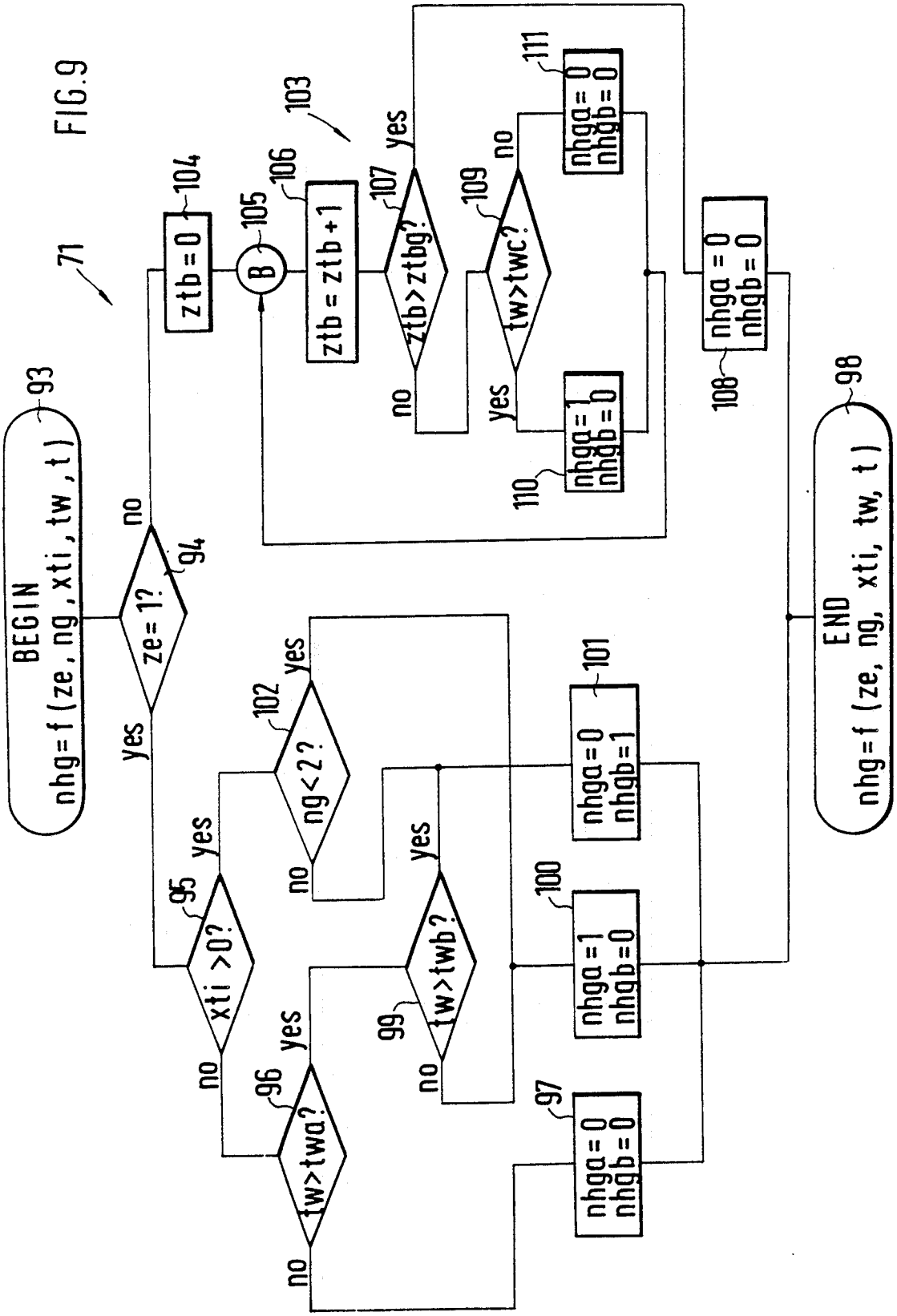
FIG. 9 is a flow chart according to FIG. 3 for a control sequence of a heater blower of the air conditioning system.

FIG. 9 shows the control sequence 71 for the heater blower as will be described in detail below.

After the program start at step 93, an inquiry at program step 94 takes place as to whether the ignition is switched on (ze=1). If this is so, the program proceeds to step 95 where it is queried whether one of the two temperature mixing flaps is open. If the answer is no, at step 96, it is queried whether signal tw from the warm air temperature sensor has exceeded a lower limit, twa. If the answer is no, the control signals nhga, nhgb are set to zero in program step 97, and the program is terminated at step 98.

If the inquiry st step 96 is positive, it is queried at step 99, whether tw already has exceeded an upper limit twb. If the answer is no, nhga is set to 1 and nhgb is set to zero (low rotational speed step) at step 100. If the answer is yes, nhga is set to zero, and nhgb is set to 1 (high rotational speed step) at step 101.

If the inquiry at step 95 is negative, it is queried whether the blower rotational speed step is smaller than a certain value (ng=2) at step 102. If the answer is no, the program is continued with program step 101, and if the answer is yes, the program is continued with program step 100.

If the inquiry at step 94 is negative (ignition off), an elapsed time counter ztb is set to zero (ztb=0) at step 104, and after a reference mark B is passed at step 105, the counter ztb is increased by 1 at step 106, and it is queried, at step 107, whether ztb has already reached a counter reading ztbg which is characteristic of the end of a predetermined afterrunning time (for example, approximately 20 minutes). If the answer is yes, nhga and nhgb are set to zero at step 108, and the program is terminated at step 98. If the answer is no, it is queried whether tw has exceeded a limit temperature twc at step 109. If the answer is yes, nhga is set to 1 and nhgb is set to zero at step 110. If the answer is no, nhga and nhgb are set to zero at step 111. In both cases, a loop is made back to reference mark B.

FIG. 10 shows a program for the control of the condenser blower 41. After the program start at step 112, it is queried whether the air conditioning signal is active (ac=1, i.e electromagnetic clutch closed) at step 113. If this is not the case, nka (low rotational speed step) and nkb (high rotational speed step) are set to zero at step 114, and the program is terminated at step 115.

If the inquiry at step 113 is positive, it is examined at step 116 whether the refrigerant pressure pac already has not yet reached a first limit value paca. If the answer is yes, the program is continued with program step 114. If the answer is no, it is queried at step 117, whether pac has exceeded a second limit value pacb. If this is not the case, nka is set to 1 and nkb is set to zero at step 118. If inquiry 117 is positive, nka is set to zero and nkb is set to 1 at step 119, and the program is terminated in each case at step 115.

The values indicated in the specification, for example, for the speed v, the speed ranges or for the desired throttle valve position are intended to be used only as standard example values. They depend largely on vehicle specific circumstances and on the design of the air conditioning system and must be adapted to an individual vehicle by testing.

A monitoring circuit for an operating condition of the heater blower may be integrated into the control apparatus 42 which, in the case of a failure of the heater blower, switches off blowers 23, 23' (ng=0). In addition, the control apparatus 42 includes an emergency function arrangement which, in the case of a sensor failure, stops only the respective control function assigned to it or replaces sensor values by fixed values or approximates them by values from other sensors.

The control apparatus 42 comprises a defrosting function which is not shown in detail and can be triggered by the defrosting key 45, and in which the blower rotational speed step ng is set to its maximum value; the outflow ducts 25 (legroom) and 26 (center nozzles) are closed; a desired temperature ts is set to a certain value (such as 27° C.) and; the electromagnetic clutch 37 of the refrigerant compressor 38 is controlled (closed) as long as an evaporator temperature tv has not yet fallen below a certain value (icing temperature). In this regard, (for the drying of the blown out air) reference is made to a German patent application Ser. No. DE 3836989 with the title "Protection Against Icing for an Evaporator of an Air-Conditioning System" filed by the applicant on Oct. 31, 1988 German Patent Office) (for the drying of the blown out air).

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An air conditioning system for a vehicle comprising:
   a chamber having outlet ducts with individually outlet ducts including blockable defrosting, center and legroom nozzles through which air processed by the air condition system is selectively guided into a passenger compartment,
   a cool air duct in fluid communication with the chamber, the cool air duct having an evaporator for providing cool air,
   at least one warm air duct in fluid communication with the chamber, the at least one warm air duct having a heat exchanger for providing warm air,
   a fresh air duct in fluid communication with the chamber for providing fresh air, the fresh air duct having a fresh air flap, a position of the fresh air flap being controlled by a motor,
   a circulating duct in fluid communication with the chamber for circulating air from the passenger compartment,
   at least one of warm air, fresh air, circulating air, fresh air cooled by the evaporator and circulating air cooled by the evaporator being guided to a blower to provide mixed air which is guided to the passenger compartment by way of the individual outlet ducts,
   an air temperature sensor arranged downstream of the blower sensing a temperature deviation of the mixed air from a desired temperature,
   a temperature mixing flap provided upstream from the blower for controlling the mixing of air to the blower,
   a mixing flap control controlling a position of the temperature mixing flap, a driving speed sensor sensing a driving speed of the motor vehicle, a mixing flap position sensor sensing the position of the temperature mixing flap, a rotational speed sensor sensing a rotational speed step of the blower, a switch sensor sensing a switching condition of an electromagnetic clutch of a refrigerant compressor, and a control apparatus for detecting the driving speed of the motor vehicle, the position of the temperature mixing flap, the rotational speed step of the blower and the switching condition of an electromagnetic clutch of a refrigerant compressor and for determining and adjusting a desired position of the fresh air flap as a function of influencing variables including the driving speed of the motor vehicle, the position of the temperature mixing flap, the rotational speed step of the blower and the switching condition of the electromagnetic clutch of the refrigerant compressor so that the mixed air has the desired temperature.

2. An air conditioning system according to claim 1, wherein the control apparatus, by way of a position indicator, detects an actual position of the fresh air flap, and adjusts the actual position to the desired position.

3. An air conditioning system according to claim 1, wherein the desired position of the fresh air flap, by way of function tables stored in a memory area of the control apparatus, is determined as a function of the influencing variables.

4. An air conditioning system according to claim 1, wherein the desired position of the fresh air flap, by means of characteristic curves simulated in the control apparatus, is determined from the influencing variables.

5. An air conditioning system according to claim 1, wherein, when the temperature mixing flap is completely open, the fresh air flap is closed irrespective of other influencing variables.

6. An air conditioning system according to claim 5, wherein the fresh air flap, is opened to a first lower position when the electromagnetic clutch of the refrigerant compressor is switched on and the temperature mixing flap is closed.

7. An air conditioning system according to claim 6, wherein the position of the fresh air flap, when the electromagnetic clutch of the refrigerant compressor is switched on, is independent of the blower rotational speed step, and when the temperature mixing flap is closed, is also independent of the driving speed.

8. An air conditioning system according to claim 7, wherein the position of fresh air flap, independently of the switching condition of the electromagnetic clutch of the refrigerant compressor, when the temperature mixing flap is partially open, is controlled such that when:

the driving speed is in a first speed range, the fresh air flap is completely open;

the driving speed is in a medium speed range greater than the first speed range, starting from the completely open position, the fresh air flap is increasingly closed down to a second position more open than the first lower position, and the driving speed is in an upper speed range greater than the medium speed range, the fresh air flap is held in the second position.

9. An air conditioning system according to claim 8, wherein the position of the fresh air flap, when the temperature mixing flap is partially open, is independent of the blower rotational speed step.

10. An air conditioning system according to claim 9, wherein the fresh air flap, independently of the switching condition of the electromagnetic clutch of the refrigerant compressor, when the temperature mixing flap is closed, is controlled such that when:

the driving speed is in the lower speed range, the fresh air flap is completely open;

the driving speed is in the medium speed range, starting from the completely open position, the fresh air flap is increasingly closed down to a given position which depends on the blower rotational speed step, and the driving speed is in the upper speed range, the fresh air flap is held in a given position which depends on the blower rotational speed step.

11. An air conditioning system according to claim 10, wherein the second position of the fresh air flap, in addition to the driving speed, is dependent on the blower step only within a given range of the blower steps.

12. An air conditioning system according to claim 11, wherein the given position of the fresh air flap is non-linearly dependent on the blower rotational speed step and becomes larger with an increasing blower rotational speed step, and at the end of the given range reaches the maximum value.

13. An air conditioning system according to claim 12, wherein the fresh air flap is completely open when the electromagnetic clutch of the refrigerant compressor is switched off, the temperature mixing flap is closed and the blower rotational speed steps are above the certain range of the blower rotational speed steps.

14. An air conditioning system according to claim 1, wherein the fresh air flap, in a warm up phase after a cold start of an internal combustion engine of the motor vehicle, is guided to a desired position with a fixed rate of change (in time).

15. An air conditioning system according to claim 14, wherein the control of the fresh air flap, after a cold start, is maintained only for a limited period of time.

16. An air conditioning system according to claim 1, wherein the position of the temperature mixing flap is also controlled by the control apparatus, and the position of the temperature mixing flap, in addition to the desired temperature and the blow out air temperature determined by the blow out temperature sensor, is also dependent on at least one of an interior temperature determined by a passenger compartment temperature sensor and an outside temperature detected by an outside temperature sensor.

17. An air conditioning system according to claim 1, wherein the control apparatus is influenced by operating elements of an operating unit having arbitrarily adjustable values for the desired temperature, the blower rotational speed step, an air distribution in the passenger compartment and a selected position providing a defrosting operation for at least one of a deicing and dehumidifying of vehicle windows, and a selected position for the operation of a refrigerant compressor.

18. An air conditioning system according to claim 17, wherein, in the defrosting operation the blower rotational speed step is set to a maximum value; a legroom flap and an outlet duct to the center nozzles are closed; a desired temperature is set to a certain value; and the electromagnetic clutch of the refrigerant compressor is switched on if an evaporator temperature is above a given evaporator temperature value.

19. An air conditioning system according to claim 17, wherein the operating unit comprises an operating element for a selective position providing a circulating air operation, the fresh air flap being closed when the circulating air operation is selected.

20. An air conditioning system according to claim 1, wherein a heater blower acting upon the warm air duct and controlled by the control apparatus, is operated in two rotational speed steps, such that when an ignition of an internal combustion engine of the vehicle is switched on:
- a first rotational speed step is selected if, when the temperature mixing is at least partially open, the blower is operated at a lower rotational speed step and, when the temperature mixing flap is closed, a warm air temperature detected by a warm air temperature sensor in the warm air duct is in a first given range;
- a second rotational speed step is selected if, when the temperature mixing flap is at least partially open, the blower is operated at a higher rotational speed step and, when the temperature mixing flap is closed, a warm air temperature detected by a warm air temperature sensor in the warm air duct is in a second given range higher than the first given range; and
- within a certain time period after the switching on of the ignition, the first rotational speed step is selected when a warm air temperature exceeds a given limit value.

21. An air conditioning system according to claim 20, wherein a monitoring circuit, which influences the control apparatus, monitors an operating condition of the heater blower and, when the heater blower fails, switches off blower.

22. An air conditioning system according to claim 1, wherein, when a sensor fails, a respective control function assigned to the failed sensor will no longer exist and the failed sensor value is replaced by at least one of a fixed value and an approximated value determined by values of other sensors.

23. An air conditioning system according to claim 1, further comprising a condenser of the air conditioning system which is subjected to forced ventilation by a condenser blower controlled by the control apparatus, the condenser blower being switched off when the electromagnetic clutch of the refrigerant compressor is switched off, and when the electromagnetic clutch of the refrigerant compressor is switched on and a low pressure level is detected by a pressure sensor in a refrigerant circuit of the air conditioning system which influences the control apparatus, the condenser blower is operated at a low rotational speed step, and when a high pressure level is detected by the pressure sensor in the refrigerant circuit of the air conditioning system the condenser blower is operated at a high rotational speed step.

* * * * *